United States Patent

[11] 3,579,099

[72] Inventor: Takayuki Kanbayashi
552 Niina, Minoo, Japan
[21] Appl. No. 830,624
[22] Filed: June 5, 1969
[45] Patented: May 18, 1971
[32] Priority: Dec. 4, 1965
[33] Japan
[31] 40/74740
Continuation-in-part of application Ser. No. 598,457, Dec. 1, 1966, now abandoned.

[54] IMPROVED FLAW DETECTION APPARATUS USING SPECIALLY LOCATED HALL DETECTOR ELEMENTS
7 Claims, 14 Drawing Figs.

[52] U.S. Cl. .................................................. 324/37
[51] Int. Cl. ............................................... G01r 33/12
[50] Field of Search ...................................... 324/37, 40, 45, 46

[56] References Cited
UNITED STATES PATENTS

| | | | |
|---|---|---|---|
| 1,998,952 | 4/1935 | Edgar et al. | 324/37 |
| 2,219,885 | 10/1940 | Barnes et al. | 324/37 |
| 2,746,012 | 5/1956 | Price | 324/37 |
| 3,202,914 | 8/1965 | Deem et al. | 324/37 |
| 3,484,682 | 12/1969 | Wood | 324/37 |

FOREIGN PATENTS

| | | | |
|---|---|---|---|
| 822,210 | 10/1959 | Great Britain | 324/45 |
| 950,696 | 2/1964 | Great Britain | 324/37 |

OTHER REFERENCES

Grubbs; W. J.; Hall Effect Devices; The Bell System Technical Journal; May, 1959; pp. 867-868 (Copy in 324-37)

*Primary Examiner*—Rudolph V. Rolinec
*Assistant Examiner*—R. J. Corcoran
*Attorney*—Watson, Cole, Grindle & Watson ABSTRACT: A pair of Hall generator elements are symmetrically mounted in the same magnetic plane closely adjacent a material surface of substantially circular cross section, one Hall generator element being mounted on each side of a null plane, to detect the variations in leakage flux emanating from the material surface as the material is spirally rotated past the Hall generator elements. The Hall generator elements are symmetrically mounted on an axis intersecting a line parallel to the longitudinal axis of the material by approximately 5° and a control current provided to each Hall generator element of the same magnitude but different polarity. The Hall generator elements are, alternately, mounted astride the null plane to be substantially nearly aligned with the null plane and the control current to each Hall generator element is of the same magnitude and polarity.

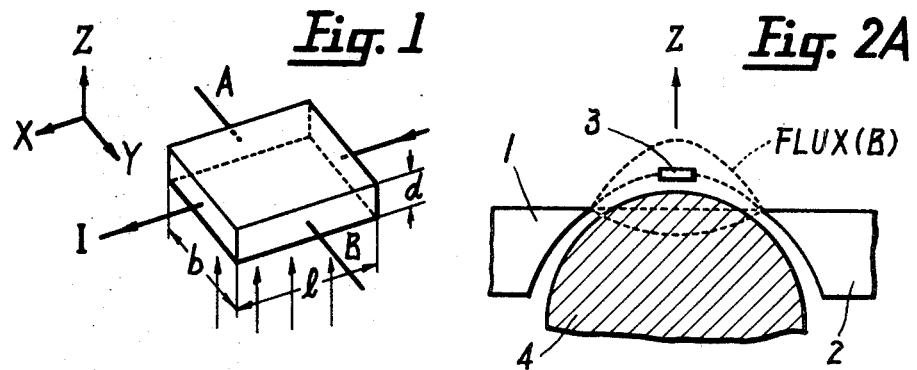
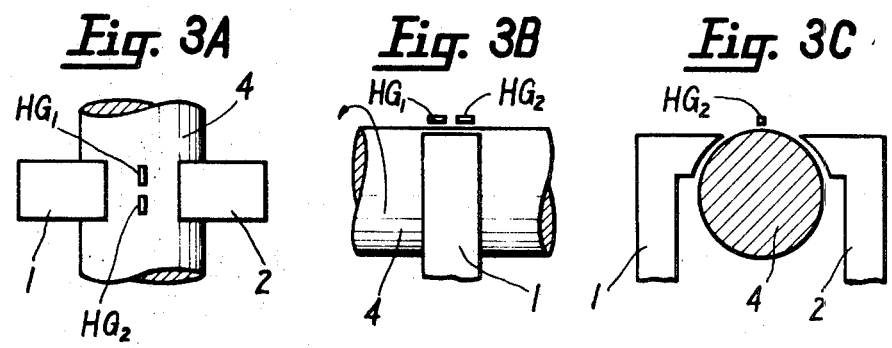
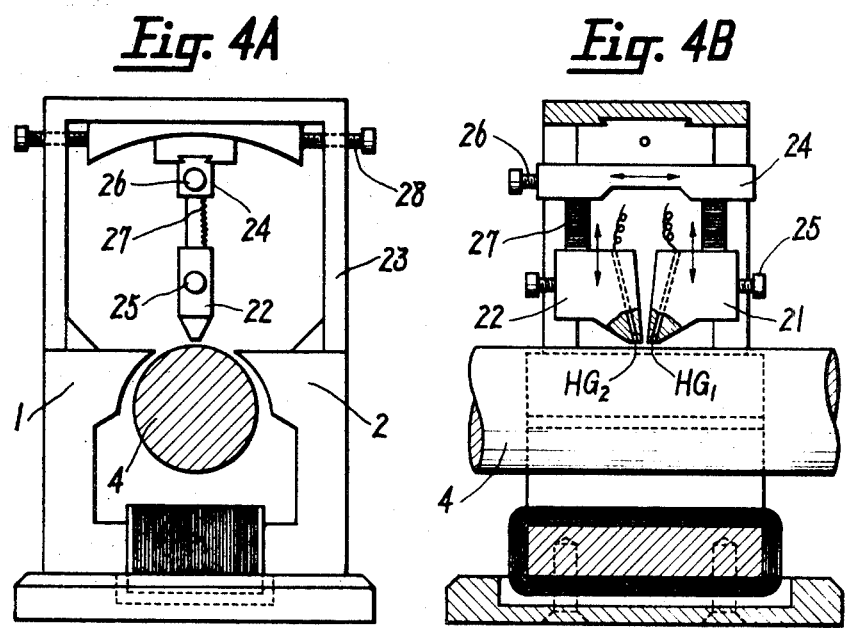

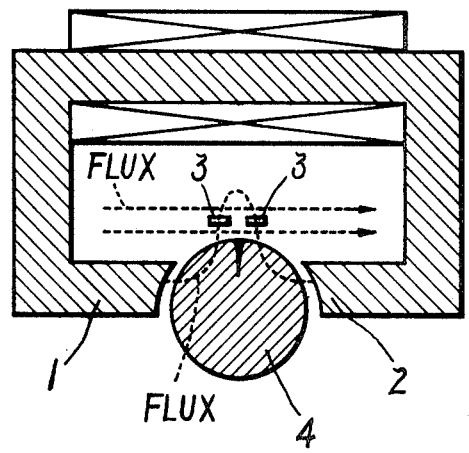

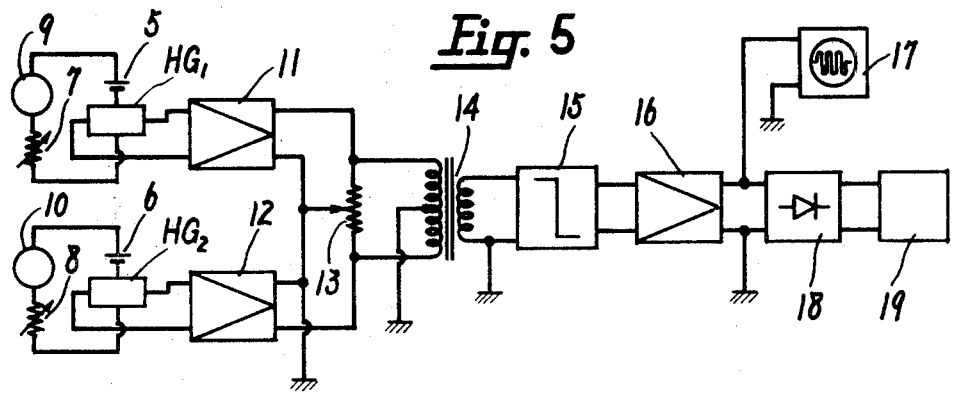
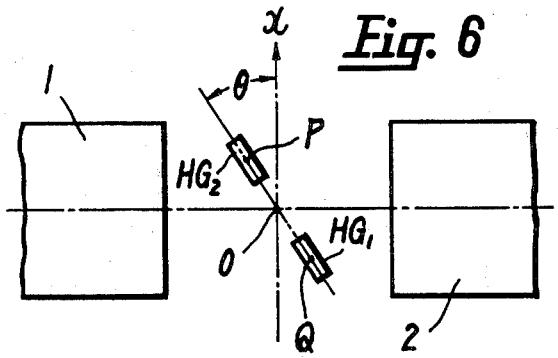
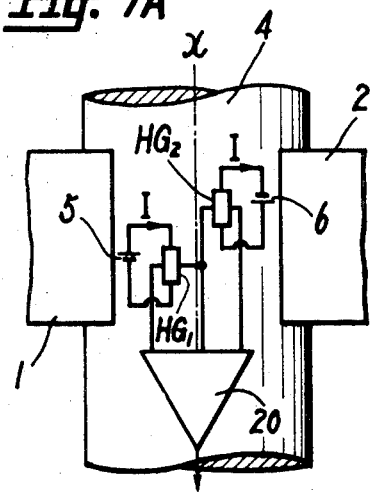 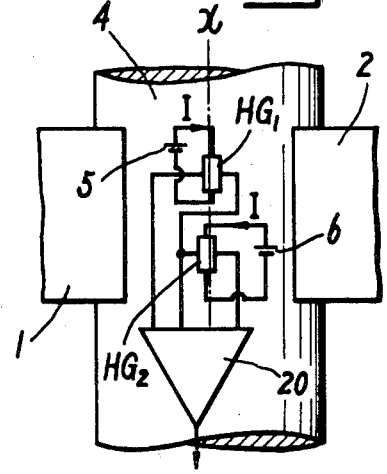

IMPROVED FLAW DETECTION APPARATUS USING SPECIALLY LOCATED HALL DETECTOR ELEMENTS

This is a continuation-in-part application of my copending application Ser. No. 598,457, filed Dec. 1, 1966, and now abandoned.

This invention relates to magnetic inspecting apparatus.

Magnetic inspection requires that a magnetic leakage flux from a flaw in a magnetized material to be tested be detected by some means. Today, as the nondestructive inspection of, for example a bar, relies mostly on a fluorescent magnetic particle inspection method, the testing speed is slow and its is very difficult to estimate the flaw depth. Therefore, the development of an automatic inspecting method of sufficiently high testing efficiency replacing the magnetic particle inspection method is desired. The present inventor has developed an improved automatic apparatus for magnetic inspection in which a Hall generator is used as the detecting means and which is disclosed herein.

The magnetic inspecting method is nondestructive and detects any discontinuity present in a magnetic material. Its principle is based on the known fact that, if a magnetic material is magnetized, a magnetic flux will leak from a discontinuity or flaw in the material and the flaw can be detected by detecting the magnetic leakage flux. The magnitude of the magnetic leakage flux will be the largest where the discontinuity is present on the surface of the test material. The more the discontinuity lies below the surface the magnetic leakage flux will be correspondingly smaller. Therefore, the discontinuities that can be detected by magnetic inspection are limited to those present on the surface or the immediate subsurface of the test material. In spite of such a disadvantage, the magnetic inspecting method has been extensively used because the apparatus is simple and no complicated operation is required.

The objects to be tested by the magnetic inspecting method have been mostly steel coatings and forgings. However, generally, most of such cast and rolled materials are so geometrically complicated that it has been difficult to automatically test them. Consequently, the various automatic inspecting apparatus utilized today test material of such simple form as a steel pipe or a round bar.

Naturally the shapes of flaws vary. The magnitude of the magnetic leakage flux from the flaw varies so much with its shape (such as the width, depth, direction and edge sharpness) that it is almost impossible to theoretically estimate the magnitude of the magnetic leakage flux. However, in practice, the problem of the quantitative determination in automatic inspection is whether the flaw to be inspected has a depth larger than an allowable depth limit. For example, such comparatively shallow cracks as 0.3 mm. present a problem. In such a flaw, it has been experimentally identified that the main influencing factor on the magnetic leakage flux is the flaw depth.

The magnetic inspecting methods practiced today may be classified as follows according to the detectors used for detecting the magnetic leakage flux:
1. Magnetic particle method.
2. Magnetic recording method.
3. Searching coil method.
4. a Hall generator method.

In the magnetic particle method, it is possible to detect fine flaws as fine magnetic particles are used, but it is not possible to estimate the flaw depth and the testing speed is slow.

In the magnetic recording method, wherein a recording tape made of a synthetic resin on which magnetic particles are deposited is used as a detector, the depth of the flaw can be estimated and the flaw detecting sensitivity is high but, since it is desired to bring the magnetic tape into close contact with the test material, such a method is not adapted to the detection of flaws in semifinished products having rough surfaces such as, for example, billets.

In the searching coil inspection method, the voltage generated from the searching coil is proportional to the variation with time of the magnitude of the magnetic flux interlinked with the coil, that is, proportional to the differential value of the magnitude of the magnetic interlinked flux with time and the number of turns of the coil. In order to increase the flaw detecting sensitivity, the number of turns of the coil must be increased. There are certain defects requiring that the size of the detector must be large. Also, the detecting voltage varies with the moving velocity of the test material or the moving velocity of the searching coil. All these factors influence the testing precision.

The inspection method using a Hall generator, as described in detail hereinafter, has the advantages that, if the control current for the Hall generator is kept constant, the generated voltage will be proportional to the magnitude of the magnetic flux which penetrates perpendicularly to the largest surface of the Hall generator and will not be influenced by the moving velocity of the Hall generator or the moving velocity of the test material. Furthermore, the magnetic leakage flux will be able to be detected without contact with the test material.

In the automatic magnetic inspection of the present invention, as semifinished products especially bars or round material having rough surfaces are to be inspected, Hall generators are effectively used as detectors for the above-mentioned reasons.

In the accompanying drawings:

FIG. 1 illustrates the Hall effect on a semiconductor placed in a magnetic field:

FIG. 2A shows a Hall generator placed in a magnetic field and the distribution of magnetic flux;

FIG. 2B illustrates the distortion of the magnetic flux pattern by a flaw in the material;

FIG. 3A is a plan view showing an arrangement of magnetic poles, a test material and the Hall generators in a magnetic inspecting apparatus;

FIG. 3B is a side view of FIG. 3A;

FIG. 3C is an elevation view of FIG. 3A;

FIG. 4A is an elevation view of an embodiment of the apparatus for mounting the detecting apparatus of the present invention;

FIG. 4B is a side view of FIG. 4A;

FIG. 5 is a combination circuit diagram and block diagram of the electronic circuit for magnetic inspecting apparatus according to the present invention;

FIG. 6 illustrates an arrangement of two Hall generators in a magnetic field;

FIG. 7A shows another arrangement of two Hall generators in a magnetic field and the interconnection of the respective Hall generators;

FIG. 7B illustrates still another arrangement and interconnection of the respective Hall generators;

Figure 8:
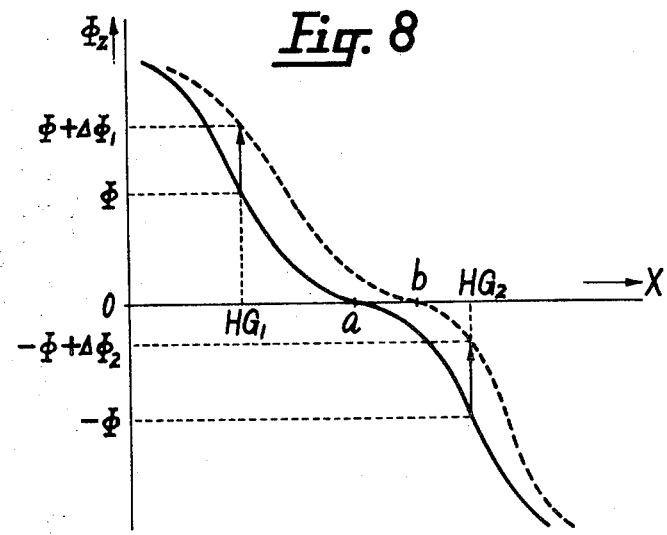
FIG. 8 illustrates the relationship between the magnetic flux component $_z$ in the direction of the Z axis detected by each of two Hall generators in a given detector arrangement.

An object of the present invention is to provide an apparatus for automatically detecting very small flaws present in test materials by using Hall generators.

A further object of the present invention is to provide an apparatus for detecting flaws correctly without influence by any magnetic fluctuation even when the test material is eccentric or noncircular.

The Hall effect is a phenomenon of a galvanomagnetic effect produced when a semiconductor is placed in a magnetic field. It is phenomenon caused by a flow of a carrier in a conductor placed so as to intersect at right angles with a magnetic field as shown in FIG. 1 whereby an electromotive force will be generated in a direction at right angles to both the magnetic field and the flow of the carrier. It was discovered by E. H. Hall in 1879.

Now, if, as shown in FIG. 1, a current is made to flow in the direction of the X axis and a magnetic field is applied in the direction of the Z axis at right angles thereto, the carrier will receive a Lorentz force of $-e \cdot V \cdot B$ in the direction of the Y axis. $e$ is the carrier charge, V is the carrier velocity and B is the flux density. As a result, the carrier will be moved to the side A in the drawing to form a space charge. Therefore, electric field Ey will be induced in the direction of the Y axis by these charges and will be balanced with the force by the magnetic field B acting on the carrier. Now, in the case of an N-type (in which the carrier is an electron and its charge is $-e$), the force acting on the electron by the magnetic field will be $$e \cdot V \cdot B \qquad (1)$$

and the force by the electric field to be balanced with it will be $$e \cdot E_Y \qquad (2)$$

Therefore, from both formulas, the electric field $E_Y$ will be $$E_Y = -V \cdot B \qquad (3)$$

If the current density is $i$ and the density of the carrier (electron) is $n$, $$i = n(e \cdot V)$$
$$V = i/ne \qquad (4)$$

Therefore, if the formula (4) is substituted in the formula (3), $$E_Y = -\frac{i \cdot B}{ne} \qquad (5)$$

Now, if $$R = -\frac{1}{ne} \qquad (6)$$

the formula (5) will be $$E_Y = R \cdot i \cdot B \qquad (7)$$

This R is a Hall constant.

$$\left(\text{In the } P\text{-type, } R = \frac{1}{ne}\right)$$

Now, if a current I in in ampere and a flux density B in gauss are given to the Hall generator, the Hall electromotive force $V_H$ will be $$V_H = b \, E_Y$$
$$i = \frac{I}{bd} \qquad (8)$$

wherein b is the width of the Hall generator and $d$ is its thickness.

If a dimension in cm. is given to $d$, $$V_H = R \frac{I \cdot B}{d} \times 10^{-8} \text{ (volts)} \qquad (9)$$

wherein R is in cm.$^3$/coulomb.

In order to increase the Hall voltage $V_H$, it is desirable to make the electron density $n$ and the thickness $d$ in the Hall generator small, to select a material of a large mobility $\mu$, and to use a form of a surface area as wide as possible. The materials used today for Hall generators are germanium, silicon, indium antimony (InSb), indium arsenic (InAs), etc. The $\mu$ values of InSb and InAs are large.

As it requires about $10^{112}$ to $10^{114}$ seconds for the Hall electromotive force to be excited, the upper limit of the usable frequency of the Hall generator will be substantially $10^{12}$ to $10^{14}$ cycles/sec. However, as a matter of fact, in case the above-mentioned semiconductor is placed in an alternating magnetic field, eddy currents will be induced in it and the Hall electromotive force will vary with the frequency. Therefore, the frequency range for obtaining uniform characteristics is though to be 0 to $10^6$ cycles/sec.

An automatic inspecting apparatus using the method of a low-frequency magnetization and the novel arrangement of Hall generator which has been developed by the present inventor will now be described.

In order to inspect an object using a magnetic inspecting method, it is necessary that the test material should be properly magnetized. There are several methods to magnetize an object. One is the direct current method in which a direct current is directly passed through the test material and another is the method in which the test material is magnetized by being held between magnetic poles. The direct current method is used generally in a residual magnetic inspection method. It has a disadvantage that, in order to magnetize a test material sufficiently to inspect it, a direct current of several hundred to several thousand amperes is required. In a permanent magnet method, no electric source is required by the generated magnetic field is, of course, a direct current magnetic field, resulting in a force attracting the test material to the magnetic pole and the automatic test material feeding apparatus (such as, for example, a conveyor roller) will be undesirably magnetically braked. However, if such a defect is accepted or due consideration is given to it, the permanent magnet can be used as the magnetizing apparatus. If an alternating current electromagnet is used, the aforementioned problem is obviated. There is a low frequency method using a line frequency and a high frequency magnetizing method. With a line frequency of 50 to 60 cycles/sec., no special current source equipment is required, but is it possible that, if the testing speed is high, the test accuracy will not be sufficient. When the magnetizing frequency us high, many eddy currents will be generated within the test material and will influence the inspection precision when using a magnetic flux leakage detection method, in accordance with the invention, which is essentially different from a flow-detecting apparatus which senses the effects of eddy currents. However, for these reasons, a low-frequency electromagnet is used. The apparatus of the present invention detects a leakage flux so that external magnetic fields, except the leakage flux, should not be detected. Furthermore, even if undesirable magnetic fields are detected, they must be excluded from the output of the detection apparatus. For this purpose, it is necessary to give due consideration to the magnetic pole structure of the electromagnet, the relative position between the material to be tested and the electromagnet and the position of the detector. In order to decrease the flux leakage directly from the magnetic poles it is preferable to make the distance between the magnetic poles wide within a range in which the magnetization of the material is to be tested so that the magnetization at the point where Hall generator is set is not weakened.

It is necessary to prevent other external magnetic flux from passing through the Hall generator and, even if such undesirable magnetic flux passes through the Hall generator, to make such flux pass parallel with the plane of the Hall generator so as not to generate an electromotive force. Further, although it is ideal to have all the magnetic flux from the magnetic poles enter into the material to be tested, in practice there is stray magnetic flux from the poles which should not be detected. Therefore, a preferred arrangement is to interpose the material 4 to be tested with a substantially U-shaped electromagnet and to set the Hall generators at the center between the magnetic poles 1, 2 of the U-shaped electromagnet, as shown in FIG. 2B. It is preferred to have the surface of the Hall generator close to the surface of the material to be tested. In this case the distance between these surfaces is generally 0.1—2.00 mm.

The Hall generators are arranged in parallel with the surface of a bar, whereby the magnetic flux leaking from the flaw meters the Hall generator at an approximately right angle, thus providing an intensive output, unaffected by the other magnetic flux lines which are parallel to each other and parallel to the Hall generator (FIG. 2B) so as not to cause a voltage to be generated. Thus, the magnetic field created by the flaw provides the input flux to the Hall generator and in order to further eliminate detection of unwanted and stray magnetic flux the present invention employs a set of two Hall generators. The example of the above-mentioned electromagnet is as shown in FIGS. 2A and 3A—3C wherein 1600 ampere turns are adopted for the inspection of round stock having a diameter of 50 mm.

In the apparatus of the present invention, in order to eliminate the above-mentioned defect, two Hall generators $HG_1$ and $HG_2$ are arranged in the same plane on null plane of the magnetizing fields of the magnetic poles 1 and 2 so as to be very close to a test material 1 and the voltages commonly provided by the respective Hall generators may be cancelled with each other by connecting their outputs differentially to the indicating apparatus. When a flaw is present under the Hall generator $HG_1$, the difference $|V_1-V_2|$ between the Hall voltage $V_1$, of the Hall generator $HG_1$ and the Hall voltage $V_2$ of the Hall generator $HG_2$ will be of a magnitude proportional to the magnetic leakage flux from the flaw. Thereby, the signal-to-noise ratio is elevated and it is possible to automatically detect fine flaws.

The Hall generators to be used for the magnetic flux inspection are of an indium arsenic system having an outside diameter of 3.7 mm. As shown in FIG. 4, two Hall generators are set at a spacing of 8 mm. These Hall generators operate on a DC control current of 180 ma. With respect to FIGS. 4A and 4B, the two generators $HG_1$ and $HG_2$ are incorporated respectively in detector mountings 21 and 22 and are fitted to a mechanical stage 24 suspended from a nonmagnetic support 23 so that two racks 27 provided on the mechanical stage may be slightly moved vertically by screws 25 and 26 and the right and left positions may be adjusted with a screw 28. By means of this adjusting device, the two Hall generators can be adjusted so as to be placed in equivalent magnetic flux positions between the magnetic field poles of the electromagnet. If the magnetic flux lines are equal to each other in the positions where the two Hall generators are placed, little noise will be produced.

The magnetic leakage flux from a flaw in the magnetized test material 4 will be detected by the Hall generators $HG_1$ and $HG_2$, as shown in FIG. 2B, and will be converted to a voltage which is fed to an electronic processing circuit. This circuit is shown in FIG. 5. In FIG. 5 the Hall generators $HG_1$ and $HG_2$ are provided with DC control current sources 5 and 6, current controllers 7 and 8 and ammeters 9 and 10, respectively, and the outputs of the Hall generators are wired to two preamplifiers 11 and 12 of the same characteristics, respectively, and may be fed to an output transformer 14 through a balance-regulating circuit 13.

The control currents may also be supplied to $HG_1$ and $HG_2$ from one source. Further, as in FIG. 7, a single differential amplifier 20 may be substituted for the two preamplifiers 11 and 12. In such case, it is necessary that the output terminals of the Hall generators should be differentially wired as in FIG. 7. The output of the output transformer 14 will pass through a variable frequency low-pass filter 15 and will be amplified in a main amplifier 16. After amplification, the output will be rectified by rectifier 18, amplified by DC amplifier 19, and will be recorded in a recording device (not shown), such as an oscillograph recorder. The output signal of the main amplifier 16 is also supplied to a synchroscope 17 for monitoring flaw detection. The output of the direct current amplifier 19 is used, though not illustrated, as an input signal for an automatic flaw-marking device, warning device, automatic test material rejecting device and product quality classifying device as required.

For the successful use of this automatic inspecting method using Hall generators the most important consideration is the arrangement of the two Hall generators $HG_1$ and $HG_2$.

In the apparatus of the present invention, for the above-mentioned reasons, two detectors are used and their outputs are differentially wired. However, in order that the outputs of the detectors may be perfectly differential and the noise output may be zero, the magnitudes of the respectively detected external and stray flux must be equal to each other in the place where the two generators are positioned. That is to say, as shown in FIG. 6, if the angle $\theta$, formed by the longitudinal axis of the test material and the line connecting the center of the detecting elements, is not zero, the noise outputs of the two detecting elements will not be zero. Only when the magnetic center $x$ between magnetic poles 1 and 2 coincides with the line PQ connecting the center P and Q of the detecting elements will the noise output be cancelled. If, because of the variation of the shape of the test material, the $x$ axis moves and the magnetic center 0 between both magnetic poles moves, even if the outputs of the detecting elements are connected differentially, the noise will not be able to be perfectly cancelled. In inspecting such nonuniform and irregularly shaped test material, it is advantageous to make the angle $\theta$ zero. However, if the magnetic leakage flux from a flaw is detected simultaneously by both detectors, as for example with a long flaw lying in the axial direction, the output signal will become zero. Therefore, the angle $\theta$ must not be zero for the detection of long flaws. Therefore, an angle of approximately 5° is used in detecting flaws.

Practical arrangements of Hall generators (detectors) are shown in FIGS. 7A and B. In FIG. 7A, in order to make it possible to detect long flaws in test materials spirally rotated, two Hall generators are arranged in the same plane in positions symmetrical to each other with respect to the magnetic center axis $x$ between the magnetic poles 1 and 2 of the magnetizing electromagnet. The null plane may be defined as that plane transverse to the field direction and parallel to the longitudinal axis of the material along which the magnetic flux is zero. The DC control current supplied to one Hall generator is the same in magnitude but reversed in polarity to the control current supplied to the other Hall generator and the generated noise voltage will be of the same phase in the two Hall generators. As a result, if the outputs of both Hall generators. As a result, if the outputs of both Hall generators are differentially amplified with differential amplifier 20, the noise voltage will be cancelled and only the flaw-detecting voltage will appear as an output. However, the disadvantage of the system is that, if the test material 4 has an eccentric or noncircular cross section, a set of Hall generators must always be arranged in positions symmetrical to each other with respect to the null plane between the magnetic poles. Now, if the positions of both Hall generators become magnetically asymmetrical due to the eccentricity or other abnormality of the test material, Hall generators $HG_1$ and $HG_2$ will provide different outputs. FIG. 8 shows the variation of the magnetic flux component $\phi_z$ in the direction of the Z axis detected by the Hall generators $HG_1$ and $HG_2$ for variations in the null plane position from the null plane $a$ between both magnetic poles on the X axis to a point $b$. $a$ is a null plane point for a test material of a circular cross section and $b$ is a null plane point for a test material with an eccentricity to the right of center. If the control current I is constant, the output voltage $V_H$ of the Hall generator will be $$V_H = K \cdot I \cdot \phi_z = K' \cdot \phi_z \quad (11)$$

Therefore, in the case where the null plane position is at point $a$, the output voltages $V_{H1}$ and $V_{H2}$ of the Hall generators will be $$V_{H1} = K \cdot \phi \text{ and } V_{H2} = -K(-\phi) = K\phi \quad (12)$$

wherein K is a constant. As the control currents of $HG_1$ and $HG_2$ are of different polarity, the signs of K in $HG_1$ and $HG_2$ are opposite to each other. Therefore, the differential output V will be $$V = V_{H1} - V_{H2} = 0 \quad (13)$$

Now, if the null plane moves from the point $a$ to the point $b$, as the Hall voltages are $$V_{H1} = K(\phi + \Delta\phi_1)$$
$$V_{H2} = -K(-\phi + \Delta\phi_2), \quad (14)$$

the differential voltage V will be $$V = V_{H1} - V_{H2} = K(\Delta\phi_1 + \Delta\phi_2) \quad (15)$$

Thus, if the present arrangement is used when the null plane fluctuates only slightly, the influences of the magnetic fluctuation on both Hall generators will be added together and the noise voltage appearing in the differential output will increase with increasing fluctuation.

In the system in FIG. 7B, DC control currents of the same polarity and magnitude are supplied to two Hall generators in a set with the centers of the two Hall generators slightly nonsymmetrical with respect the null plane. In this arrangement, as the Hall generators can be considered to be arranged substantially on a straight line in the axial direction (the direction x in FIG. 7B) of the test material 4, the influence of the magnetic fluctuation caused by the eccentricity or the like of the test material will be received to substantially the same degree by the two Hall generators and will not appear in the differential output. Further, if the Hall generator outputs are differentially amplified and if the test material is propelled with spiral rotation, it will be possible to detect at substantially the same sensitivity not only partial flaws in the test material but also flaws present over the entire length of the test material.

The situation where the null plane position has changed from the point $a$ to the point $b$ is considered in the same manner as is mentioned above. Now, when the null plane position is at the point $a$, $$V_{H1} = K\emptyset'$$
and
$$V_{H2} = K(-\emptyset') = -K\emptyset' \quad (16)$$

wherein K is a constant. As the control currents of the Hall generators $HG_1$ and $HG_2$ are of the same phase, the signs of K of both will be the same. Therefore, the differential output will be $$V = V_{H1} - V_{H2} = 2K\emptyset' \quad (17)$$

Thus a noise voltage will be generated. However, by arranging the Hall generators $HG_1$ and $HG_2$ very close to the null plane position $a$, $\emptyset'$ approaches zero and the noise is reduced so as not to be a problem in practice. On the other hand, when the null plane position moves from the point $a$ to the point $b$, as the respective Hall voltages are $$V_{H1} = K(\emptyset' + \Delta\emptyset_1)$$
and
$$V_{H2} = K(-\emptyset' + \Delta\emptyset_2) \quad (18)$$

the differential outputs V of both will be $$V = V_{H1} - V_{H2} = K(2\emptyset' + \Delta\emptyset_1 - \Delta\emptyset_2)$$
$$= (\Delta\emptyset_1 - \Delta\emptyset_2) \quad (19)$$

Therefore, according to the present arrangement, the influence of the magnetic fluctuation will appear as a difference value and will be therefore much smaller than in the arrangement in FIG. 7A. In fact, the inspection of a round bar of 50 mm. diameter and 4 mm. eccentricity using the present arrangement resulted in the generation of a periodic noise voltage of negligible value.

Figure 9:
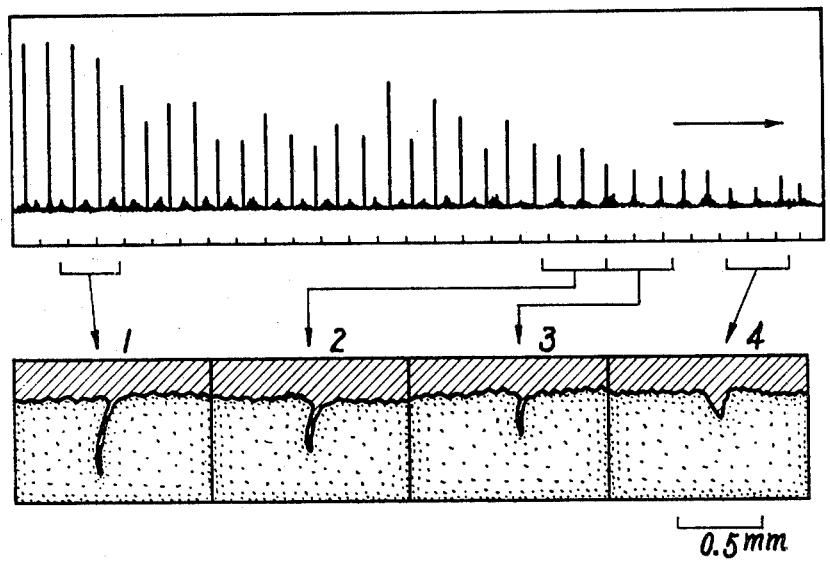
FIG. 9 is a view showing an example of an inspection record obtained with a magnetic inspecting apparatus of the present invention.

FIG. 9 illustrates the results of an inspection of a 50 mm. diameter bar with the apparatus of the present invention and shows detected flaws corresponding to microscopic photographs having a magnification of 30 times.

The inspecting conditions were:
Air gap between the Hall generator and the test material: 0.3 mm.
Distance between the centers of the Hall generators: 8 mm.
Test material r.p.m.: 10 r.p.m.
Rotating feeding pitch of the test material: 5 mm./revolution.
Gain of the main amplifier: 30 db.
Chart velocity: 1 mm./sec.
Magnetizing voltage, frequency and ampere turns: 100v.—60—1,560 ampere turns.

Now, in inspecting a round bar spirally at a pitch of 5 mm./revolution, in order to make the testing speed more than 5m./min., the number of revolutions of the test material must be made more than 100 r.p.m. As described above, if the test material is rotated at more than 100 r.p.m., at a magnetizing frequency of 60 c/s, the reproductivity of the measurement will be poor. In order to determine the frequency of the magnetizing current to be used in a case where the test material rotates at a high speed, the frequency of the flaw signal must be determined. Now, if it is assumed that the magnetic leakage flux from a flaw is produced from one end of the flaw after entering the other end, that is, the width W in mm. of the flaw is equal to the wavelength of the flaw signal, and the magnetic leakage flux is to be detected with two Hall generators, the frequency $f$ in cycles/sec. of the flaw-detecting signal will be 65.5 cycles/sec. from the equation:

$$f = \frac{2\pi r \times RPS}{2b + W}$$

wherein $r$ is the radius of the test material, $b$ is the width of the Hall generator and RPS is a frequency per second.

It is desirable that the relation between the frequency $fe$ of the magnetizing current and the frequency $fs$ of the flaw detecting signal is such that the magnetizing current should always have a momentary maximum value at least once in each half-cycle of the flaw signal. Therefore, it is desirable that $fe > 2 fs$ or, from a consideration of reproducibility, $fe > 3 fs$. Therefore, in order that the test material may be inspected at a high degree of reproducibility at rotational speeds of more than 100 r.p.m., the frequency of the magnetizing current must be higher than 200 cycles/sec. However, when the frequency is more than 1,000 cycles/sec., because of the skin effect, there is an increase of noise due to the surface roughness of the test material and it will not be desirable to use such a high-frequency current source.

Therefore, the present inventor has obtained an inspection precision high enough for field tests by using a magnetizing frequency of 560 cycles/sec. at a high speed of inspection and with a rotating speed of 150 r.p.m. by using the apparatus illustrated in FIG. 4. Briefly, as set forth above, the use of eddy currents produces noise in the search coil or Hall detector which is undesirable and reduces the applicability of such prior art inspection techniques. Consequently, the apparatus of the present invention provides means for magnetizing a material so as to establish therein a leakage flux which is created by the flaws within the material itself. Furthermore, the apparatus requires a pair of Hall generator elements for detecting the leakage flux emanating from a flaw on the surface or within the material. These Hall generator elements are symmetrically mounted with respect to the null plane which is induced in the material by the magnetizing means. This enables the Hall generators to be located with respect to the null plane so as to cancel out the noise voltages and thereby provide a more accurate output signal through the differentially connected detecting means to eliminate the noise and enhance the signal-to-noise ratio.

I claim:
1. Magnetic detection apparatus for detecting flaws in a material, comprising;
   means for magnetizing the surface of a material of substantially circular cross section with an alternating magnetic flux, said flux being directed transverse to the longitudinal axis of the material, means for spirally rotating the material along its longitudinal axis to expose the entire surface of the material to the magnetizing means, said means for magnetizing the surface causing said magnetic field to have a zero component in a null plane transverse to said field direction and parallel to the longitudinal axis of the material,
   a pair of Hall generator elements for detecting the leakage flux emanating from a flaw in said material, said Hall generator elements lying adjacent the material surface in a plane parallel to the direction of the magnetic field with the centers of said Hall elements lying on an axis which intersects a line parallel to the longitudinal axis of the material at an angle of substantially 5°, means for adjusting the Hall elements in the direction of the magnetic field so that they are symmetrically mounted one on each side of the null plane, means for detecting the signal outputs from each of said Hall generating elements being differentially connected to the detecting means to eliminate noise and enhance the signal-to-noise ratio.

2. Magnetic detection apparatus according to claim further comprising means for applying a DC bias current to the Hall generator elements and wherein the DC bias current is of the same magnitude by but different polarity for each Hall generator.

3. Magnetic detection apparatus according to claim 1 further comprising means for mounting each of the Hall generator elements with respect to the material surface to be independently movable in each of three mutually perpendicular directions.

4. Magnetic detection apparatus according to claim 3 wherein said means for movably mounting said Hall generator elements includes a support structure, means for retaining each of said a Hall generator elements, said means for retaining being movable in a plane normal to the surface of said material, means for moving said retaining means in said normal plane, means for adjusting said means for retaining in a plane parallel to said longitudinal axis of said material, and means for moving said means for retaining in a plane transverse to said longitudinal axis.

5. Apparatus according to claim 4 wherein said support structure further includes spaced parallelly extending toothed racks, said means for moving said retaining means in said normal plane including rotatable means engaging said toothed racks, said means for retaining are mounted on threaded support members, said threaded support members are rotatable to provide said adjustment, and said means for moving said means for retaining in said transverse plane including threaded means engaging said support structure whereby rotation of said threaded means provides said movement in a plane transverse to said longitudinal axis.

6. Apparatus according to claim 1 wherein the frequency of said means for magnetizing is at least three times the frequency of the magnetic leakage flux from said flaw.

7. Magnetic detection apparatus according to claim 6 wherein the means for magnetizing provides a continuous alternating magnetic flux between 50 and 1000 cycles per second.